US012607563B2

(12) United States Patent
Catanzaro et al.

(10) Patent No.: US 12,607,563 B2
(45) Date of Patent: Apr. 21, 2026

(54) TOP HAT ILLUMINATION BIOLOGICAL SAMPLE IMAGING DEVICES, AND METHODS OF USING THE SAME

(71) Applicant: Bionano Genomics, Inc., San Diego, CA (US)

(72) Inventors: Brian Catanzaro, San Diego, CA (US); Sidra Haiy, San Diego, CA (US)

(73) Assignee: Bionano Genomics, Inc., San Diego, CA (US)

( * ) Notice: Subject to any disclaimer, the term of this patent is extended or adjusted under 35 U.S.C. 154(b) by 170 days.

(21) Appl. No.: 18/516,191

(22) Filed: Nov. 21, 2023

(65) Prior Publication Data

US 2024/0167957 A1     May 23, 2024

Related U.S. Application Data

(60) Provisional application No. 63/427,590, filed on Nov. 23, 2022.

(51) Int. Cl.
  *G01N 21/64*      (2006.01)
  *G02B 27/09*      (2006.01)
(52) U.S. Cl.
  CPC ..... *G01N 21/6458* (2013.01); *G01N 21/6428* (2013.01); *G01N 21/6447* (2013.01); *G02B 27/0927* (2013.01); *G02B 27/0977* (2013.01)
(58) Field of Classification Search
  CPC ................................................. G02B 27/0927
  See application file for complete search history.

(56) References Cited

U.S. PATENT DOCUMENTS

| | | | |
|---|---|---|---|
| 9,442,295 B2 | 9/2016 | Matsumoto et al. | |
| 2004/0125441 A1* | 7/2004 | Wang ................... | G02B 5/1866 |
| | | | 359/368 |
| 2011/0109907 A1* | 5/2011 | Meyers ............... | G01N 21/648 |
| | | | 356/445 |

(Continued)

FOREIGN PATENT DOCUMENTS

| | | |
|---|---|---|
| JP | 2007-147743 A | 6/2007 |
| WO | WO2010135323 A1 | 11/2010 |

(Continued)

OTHER PUBLICATIONS

Laskin et al., Building beam shaping optics for micromachining, Proceedings of SPIE—The International Society for Optical Engineering 9346:934615, Feb. 2015.

(Continued)

*Primary Examiner* — Thanh Luu

(74) *Attorney, Agent, or Firm* — Bret E. Field; Bozicevic, Field & Francis LLP

(57)     ABSTRACT

Top Hat illumination biological sample imaging devices are provided. Aspects of the imaging devices include: a laser illumination source configured to produce a collimated gaussian beam having a specific diameter; a beam converter configured to convert the collimated gaussian beam into a collimated, uniform irradiance over a region in space; a sample interrogation location in light receiving relationship with the beam converter; and a detector in light receiving relationship with a biological sample interrogation location. Also provided are methods of using the devices, e.g., in genome mapping and other applications.

15 Claims, 11 Drawing Sheets

(56) References Cited

U.S. PATENT DOCUMENTS

| | | | |
|---|---|---|---|
| 2019/0258067 A1* | 8/2019 | Suhara | B23K 26/0648 |
| 2020/0182773 A1* | 6/2020 | Li | G02B 19/0052 |
| 2020/0241309 A1 | 7/2020 | Yamada | |
| 2020/0326238 A1 | 10/2020 | Akkus et al. | |
| 2021/0181113 A1 | 6/2021 | Lo et al. | |

FOREIGN PATENT DOCUMENTS

| | | |
|---|---|---|
| WO | WO2011038327 A1 | 3/2011 |
| WO | WO2011050147 A1 | 4/2011 |
| WO | WO2012054735 A2 | 4/2012 |
| WO | WO2015017801 A1 | 2/2015 |
| WO | WO2015134785 A1 | 9/2015 |
| WO | WO2016036647 A1 | 3/2016 |
| WO | WO2020005846 A1 | 1/2020 |

OTHER PUBLICATIONS

CSDOE Technology, Laser Line Module, Semiconductor Lasers, Line Generation Modules, pp. 1-8, 2022, https://www.ayasecorporation.com/csdoe-technolgies, accessed on Aug. 1, 2022.

* cited by examiner

Laser 110

Beam Expander 115

TopHat Converter 120

Telephoto Lens Pair 125

Collimation 130

Figure 5:
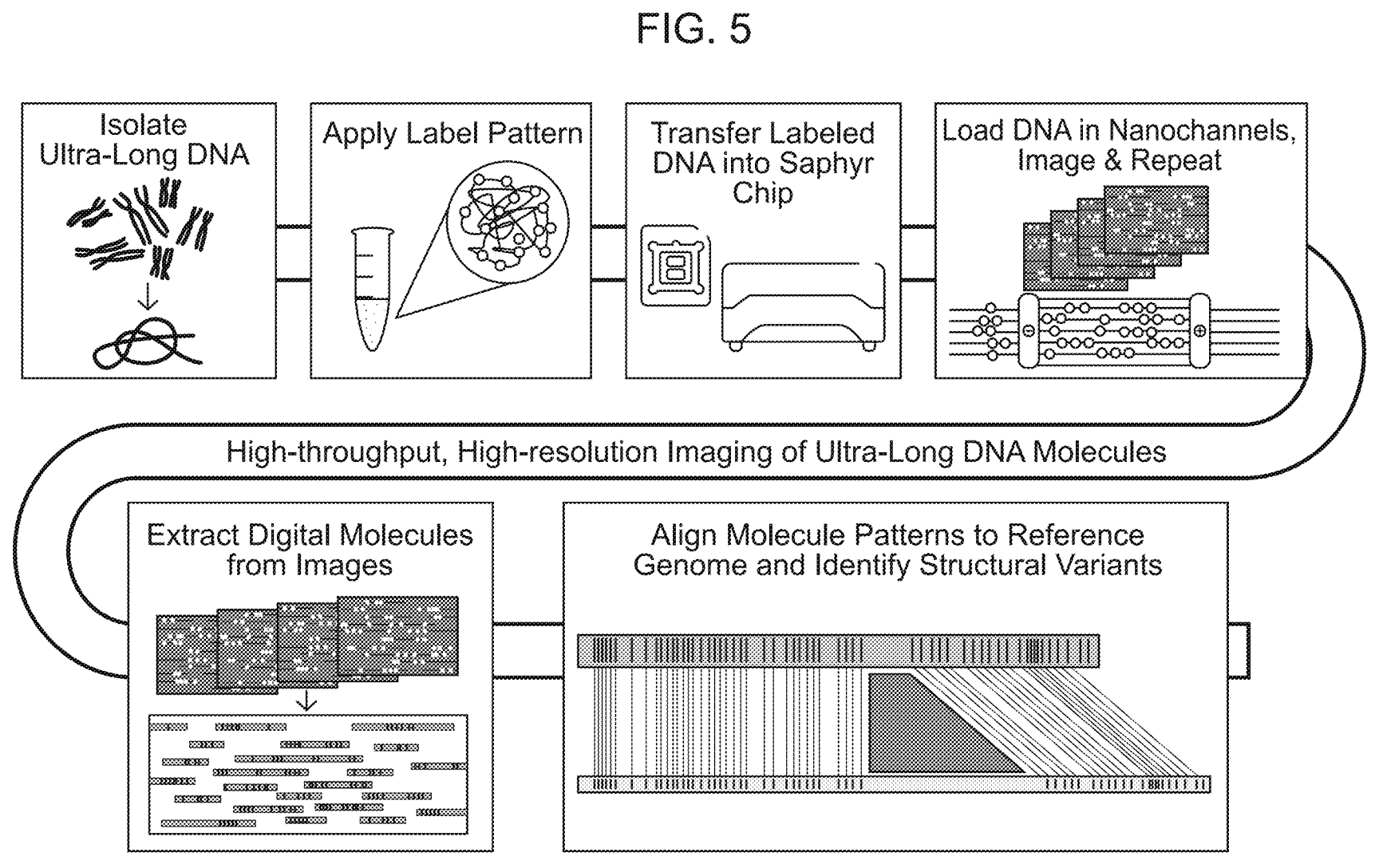

Isolate Ultra-Long DNA

Apply Label Pattern

Transfer Labeled DNA into Saphyr Chip

Load DNA in Nanochannels, Image & Repeat

High-throughput, High-resolution Imaging of Ultra-Long DNA Molecules

Extract Digital Molecules from Images

Align Molecule Patterns to Reference Genome and Identify Structural Variants

Saphyr OGM Platform with Gaussian Illumination

Aperture

Large Gaussian Beam is clipped by
the FOV Aperture

Beam Profile has a hot center and dim corners

Beam Profile has a hot center and dim corners

Incoherent Irradiance

X coordinate value

8/3/2017
Detector 6, NSCG Surface 1: Row 75, Y = 5.2079E+00
Size 12.000 W X 12.000 H Millimeters, Pixels 101 W X 101 H, Total Hits = 226150
Peak Irradiance : 6.1509E-01 Watts/cm^2
Total Power : 2.2615E-01 Watts Zemax
Zemax OpticStudio 16.5 5P4

Paraxial Model (EFL = 3.3mm).zmx
Configuration 1 of 1

Top Hat Illumination

Aperture

Flat Square Beam only 10-15% larger than aperture, minimizing losses due to clipping Beam Profile is Mostly Flat

Illumination Prior to Aperture:

Illumination Following to Aperture:

Histogram of Intensity Per ROI
20pixel x 20pixel subsections

TOP HAT ILLUMINATION BIOLOGICAL SAMPLE IMAGING DEVICES, AND METHODS OF USING THE SAME

CROSS-REFERENCE TO RELATED APPLICATIONS

Pursuant to 35 U.S.C. § 119 (e), this application claims priority to the filing date of U.S. Provisional Patent Application Ser. No. 63/427,590 filed Nov. 23, 2022, the disclosure of which application is incorporated herein by reference in its entirety.

INTRODUCTION

Imaging is commonly used for evaluating biological samples. In some applications, a biological sample is loaded into a fluidic device, e.g., a container or a microfluidic cartridge having a fluidic chamber or a more complex fluidic network. Next, at least a portion of the fluidic device is imaged by an imaging system to detect one or more analytes in the biological sample. An imaging objective, having one or more lenses, may be used to image the relevant portion or portions of the fluidic device onto an image sensor.

One application in which biological samples are imaged is genome mapping. Genome mapping in fluidic nanochannels is a robust technology able to interrogate genome structural variation (SV) in megabase length DNA molecules outside the detection range of next generation sequencing (NGS). These genome mapping in fluidic channel technologies, such as nick label repair stain chemistry (NLRS) or directly labeled (non-damaging) using the direct label and stain chemistry (DLS) (both from Bionano Genomics, San Diego, CA) are able to generate structurally accurate genome assemblies for large and complex plant and animal genomes.

Since fluorescent imaging systems, including genomics instruments, require high throughput, higher laser power is often required as the exposure time is inversely proportional to the illumination power. Multiple lasers are often required to image multiple fluorophores present in samples. Given that the laser tends to be a significant cost of the instrument, throughput (images per unit time) can be limited by the cost effectiveness of laser sources. Currently, there is little economy of scale in lasers, therefore the cost per watt (power) of laser systems varies little over the power range of lasers.

SUMMARY

The inventors have realized that, in order to achieve more efficient delivery of laser power to a sample plane, the achromatic conversion of Gaussian illumination to uniform illumination can effectively deliver more optical power to the sample for less than the cost of increasing the laser power and/or adding more lasers.

Top hat illumination biological sample imaging devices are provided. Aspects of the imaging devices include: a laser illumination source configured to produce a collimated gaussian beam having a specific diameter; a beam converter configured to convert the collimated gaussian beam into a collimated, uniform irradiance over a region in space; a sample interrogation location in light receiving relationship with the beam converter; and a detector in light receiving relationship with a biological sample interrogation location.

Also provided are methods of using the devices, e.g., in genome mapping and other applications.

BRIEF DESCRIPTION OF THE FIGURES

FIG. 5 illustrates an optical genomic mapping workflow that may be performed with the device and chip shown in FIGS. 2 to 4B.

DETAILED DESCRIPTION

Figures 1, 2:
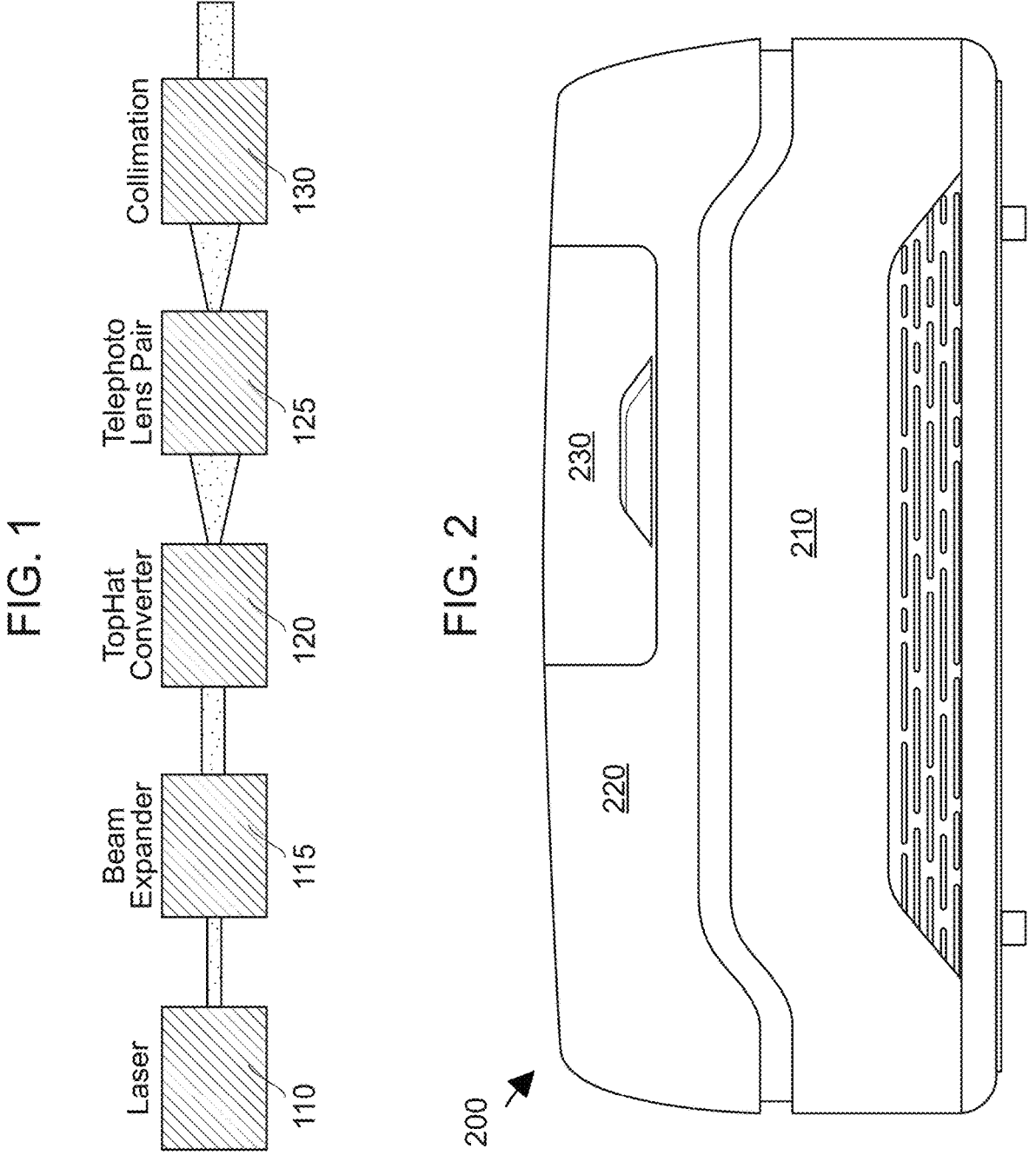
FIG. 1 provides a schematic illustration of a sample illumination component according to an embodiment of the invention.
FIG. 2 shows an optical genomic mapping device according to an embodiment of the invention.

Top Hat illumination biological sample imaging devices are provided. Aspects of the imaging devices include: a laser illumination source configured to produce a collimated gaussian beam having a specific diameter; a beam converter configured to convert the collimated gaussian beam into a collimated, uniform irradiance over a region in space; a sample interrogation location in light receiving relationship with the beam converter; and a detector in light receiving relationship with a biological sample interrogation location. Also provided are methods of using the devices, e.g., in genome mapping and other applications.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Devices

As summarized above, biological sample imaging devices are provided. By biological sample imaging device is meant a device that is configured or designed to obtain images of a biological sample or components thereof. In other words, biological sample imaging devices are devices that are designed to obtain a representation of the external form of a biological sample or component thereof. Examples of biological samples that may be imaged with devices of the invention include liquid samples containing objects of interest, e.g., biopolymers, such as nucleic acids and proteins, cells or components thereof, e.g., organelles, tissues or components thereof, etc. In some instances, imaging devices of the invention are configured to obtain images of biopolymers, such as nucleic acids, e.g., as described in greater detail below. In some instances, the imaging devices are configured to obtain images of labeled nucleic acids, such as fluorescent labeled genomic DNA. Where the target objects, e.g., genomic DNA, are labeled with fluorescent labels, imaging devices of the invention configured to obtain images of such fluorescently labeled objects may be viewed as biological sample fluorescent imaging devices.

In some embodiments, devices of the invention allow for the uniform detection of light (e.g., fluorescent light) from an irradiated sample. In some such embodiments, uniform detection of light from the sample is achieved by uniform irradiance of the sample (e.g., as described in further detail below). In certain instances, the subject uniform irradiance allows for the efficient illumination of a wider field of view in comparison to systems that are incapable of uniform irradiance. By "efficient" illumination, it is meant illumination that is, e.g., cost- and/or resource efficient. For example, in some conventional illumination systems in which the intensity of laser light changes and/or diminishes throughout the field of view, higher-power lasers—which are often more expensive—are employed to compensate for this effect. The uniform irradiance of the sample discussed herein consequently permits the use of lower power—and lower cost—light sources than would normally be required for the same application. Accordingly, in some cases, the present invention facilitates the use of light sources that are lower in power as compared to light sources that would normally be required for the same application by 50% or less, 45% or less, 40% or less, 35% or less, 30% or less, 25% or less, 20% or less, 15% or less, 10% or less, and including 5% or less. Correspondingly, in some cases, the present invention facilitates the use of light sources that are less expensive as compared to light sources that would normally be required for the same application by 50% or less, 45% or less, 40% or less, 35% or less, 30% or less, 25% or less, 20% or less, 15% or less, 10% or less, and including 5% or less. In additional instances, uniform detection of light produced by the invention permits the use of detectors having less complexity and lower cost. In some cases, the present invention facilitates the delivery of illumination that increases the rate at which images can be acquired compared to similar applications by 10% or more, 15% or more, 20% or more, 25% or more 30% or more, 35% or more, 40% or more, 45% or more, 50% or more, 55% or more, 60% or more, 65% or more, 70% or more, 75% or more, 80% or more, 85% or more, 90% or more, 95% or more, 100% or more, 200% or more and including 300% or more. Furthermore, in some embodiments, the subject devices may be employed in conjunction with multiple lasers each emitting light of a different wavelength due to the uniform irradiance described herein.

Aspects of the imaging devices include: a laser illumination source configured to produce a collimated gaussian beam having a specific diameter; a beam converter configured to convert the collimated gaussian beam into a collimated, uniform irradiance over a region in space; a sample interrogation location in light receiving relationship with the beam converter; and a detector in light receiving relationship with a biological sample interrogation location. Each of these components is now described in greater detail below.

Illumination Source

Imaging devices of embodiments of the invention include an illumination (i.e., light) source. In embodiments, the light source may be any suitable broadband or narrow band source of light. Depending on the components in the sample to be imaged (e.g., labeled biopolymers) the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chloride (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), fiber laser, or a frequency doubled- or frequency tripled implementation of any of the above mentioned lasers. The laser may emit into free-space (e.g. air) or may be emitted into a fiber optic or waveguide prior to subsequent components. Of particular interest are the emission into single mode fiber optics and single mode waveguides which provide output mode profiles that are close to Gaussian.

In embodiments, the output of the light source has a gaussian profile. Light sources with gaussian profile output are among the most efficient at converting electrical energy to optical, single mode laser output. The phrase "gaussian profile" is used in its conventional sense to describe a light beam where the electric field and intensity profile in a plane perpendicular to the beam axis can be described with a Gaussian function. It implies a specific single mode operation of a laser where the electric field amplitude and phase are interrelated in such a manner that the beam not only has a predictable intensity profile, but also a predictable beam divergence or radius of curvature. Laser beams often occur in the form of Gaussian beams, where the transverse profile of the optical intensity of the beam with a power P can be described with a Gaussian function:

$$I(r, z) = \frac{P}{\pi w(z)^2/2} \exp\left(-2\frac{r^2}{w(z)^2}\right)$$

and $$w(z)^2 = w_0^2\left[1 + \left(\frac{\lambda z}{\pi w_0^2}\right)^2\right]$$

where the beam radius w(z) is the distance from the beam axis where the intensity drops to $1/e^2$ ($\approx 13.5\%$) of the maximum value, and the radius of curvature can be described as:

$$E = E_0 \frac{w_0}{w(z)} \exp\left\{-\iota\left[\frac{2\pi n}{\lambda}z - \tan^{-1}\frac{z}{z_0}\right] - r^2\left(\frac{1}{w^2(z)} + \iota\frac{\pi n}{R\lambda}\right)\right\}$$

and $$R(z) = z\left(1 + \left(\frac{z_0}{z}\right)^2\right)$$

and

-continued $$z_0 = \frac{\pi w_0^2 n}{\lambda}$$

where the radius of curvature R is the radius of a spherical wavefront, and the electric field is E. The width of the Gaussian beam may vary. In certain cases, illumination sources of the invention produce a Gaussian beam ranging in width (defined as $1/e^2$ width) from 0.5 mm to 1.5 mm, such as 0.6 mm to 1.0 mm, and including 0.6 mm to 0.8 mm. In embodiments, illumination sources are configured to produce a Gaussian beam having a width of 0.7 mm. Noteworthy is that the description of a Gaussian beam is both the intensity, how the waist changes with distance along the beam axis, and the relationship with the phase curvature. Of particular importance is the location of the beam waist, where the beam radius is minimized. This is where the beam is collimated. In addition is the definition of the Rayleigh range, which is frequently used as an engineering definition of the tolerance around the location of the minimum radius where the beam has a phase curvature that is sufficiently close to flat to be deemed collimated. Additional details regarding Gaussian beam optics may be found in Yariv, A. (1991). *Optical electronics*, incorporated by reference herein.

Illumination sources of interest produce collimated light beams having gaussian profiles. While the invention can be used with beams that are not collimated, the conversion from converging (divergence) beams with a non-zero radius of curvature can be converted to a collimated beam using optics placed at the appropriate distance with the appropriate optical power. As the light beams are collimated, they are beams of light (e.g., laser beams) that propagate in a homogeneous medium (e.g. in air) with a low beam divergence, so that the beam radius does not undergo significant changes within moderate propagation distances (e.g. the Rayleigh range). In some instance, a light source is optically coupled to a beam expander that produces a collimated light beam having a gaussian profile from the output of the light source. The input to the beam expander may or may not be collimated to within the required tolerance. As such, embodiments of illumination sources employed in devices of the invention include a laser optically coupled to a beam expander (i.e., where the beam expander is in light receiving relationship with the output of the laser) such that the beam expander produces a collimated beam having a gaussian profile from the beam output of the laser.

In some embodiments, the illumination source comprises multiple lasers. Any convenient number of lasers may be employed. In certain instances, the illumination sources comprises 2 or more lasers, such as 3 or more lasers, 4 or more lasers, 5 or more lasers, 6 or more lasers, 7 or more lasers, 8 or more lasers, 9 or more lasers, and including 10 or more lasers. Where multiple lasers are employed, each laser may be active at the same or different times. In embodiments, 2 or more lasers (e.g., 3 or more lasers, 4 or more lasers, etc.) are configured to illuminate the sample simultaneously. The lasers in the plurality of lasers may be, in some versions, configured to emit different wavelengths of light. In some such versions, each laser in the plurality of lasers may independently be configured to emit light having wavelengths ranging from 200 nm to 1500 nm, such as from 250 nm to 1250 nm, such as from 300 nm to 1000 nm, such as from 350 nm to 900 nm and including from 400 nm to 800 nm. In select cases, one or more of the lasers in the plurality of lasers is configured to emit light at 488 nm. In select cases, one or more of the lasers in the plurality of lasers is configured to emit light at 532 nm. The uniform sample illumination of the present invention may, in embodiments, facilitate the use of multiple lasers. As opposed to conventional instruments characterized by uneven sample irradiation (i.e., where portions of the sample may be irradiated by light having a greater or lesser intensity relative to another portion), devices of the invention (as described in more detail below) permit the irradiation of the sample by multiple lasers simultaneously. In some cases, devices of the invention permit the irradiation of the sample by multiple lasers sequentially. In select cases, the irradiation is always in a fashion that is uniform, but which can be spatially separated or spatially overlapping.

In such instances, the beam expander may include one or more optical components configured to collimate the light output by the light source. In some instances, the beam expander includes a series of optics placed between the laser and the beam converter (described in greater detail below) in order to match both the size (waist) of the Gaussian beam to the beam converter as well as ensure that the beam is collimated when it illuminates the beam converter. The beam expander may, in certain instances, be configured to alter the size of the beam such that the resulting beam width (defined as $1/e^2$ width) ranges in size from 1.0 mm to 2.0 mm, such as from 1.4 mm to 1.8 mm, and including from 1.5 mm to 1.7 mm. In some embodiments, the beam expander is configured to alter the size of the beam such that the resulting beam has a width of 1.6 mm.

The number of optical components making up the beam expander may vary, ranging in some instances from 2 to 5, such as 2 to 4. In some cases, the beam expander includes 2 optical components placed between the output of the laser head and the input of the beam converter. In some cases, this configuration is used when the beam diameter of the input and output as well as the prescription of the optical components are sufficiently controlled for the application such that only the spacing of the lenses is a degree of freedom in alignment for the purpose of collimating. In other cases, especially when the output of the laser and/or the manufacturing of the optical elements are not sufficiently well controlled, the beam expander includes 3 optical components placed between the output of the laser head and the input of the beam converter. In some such cases, the beam expander can be configured merely by changing the spacing of the three optical components to control both the output beam diameter and establish the collimation of the output sufficiently for the beam converter. In select instances, one of the optical components may be fixed in space, while another optical component may be moveable, such that the desired size and collimation of the beam may be obtained. In even more specific instances, one of the components may act as a single lens to expand the beam and the other two components may act together as an effective lens whose focal length can be varied by the spacing between these two components. In this configuration, the output diameter is controlled by changing the spacing between the last two lenses and their effective focal length and the collimation is achieved by varying the separation between the first lens and this second group of lenses. Optical components making up the beam expander may vary as desired, where examples of such components include, lenses, mirrors, and the like.

Each optical component of the beam expander may comprise a single optical element, or multiple optical elements. By "optical element" it is meant an optical entity that is a constituent of an optical component. For example, in one embodiment where at least one of the beam expander optical components includes a lens, the optical component may comprise multiple (e.g., bonded) glass elements that form a lens when considered together. Alternatively, an optical component may be comprised of a single optical element, such as where a lens includes a single glass element (i.e., as opposed to multiple glass elements). The number of optical elements associated with each optical component may range from, for example, 1 to 3, such as 1 to 2. In some instances, one or more optical components of the beam expander includes 1 optical element. In additional instances, one or more optical components of the beam expander includes 2 optical elements.

The arrangement of optical components may vary. In some cases, the optical components are arranged in a Keplerian telescope configuration (i.e., combining a positive lens with a positive lens). In other cases, the optical components are arranged in a Galilean telescope configuration (i.e., combining a negative lens with a positive lens). Further details regarding such arrangements may be found in, e.g., Smith, W. J. (2008). *Modern optical engineering: the design of optical systems*, incorporated by reference herein in its entirety. Embodiments of the invention also include analogs of the above-described configurations, i.e., where the optical components are any combination of lenses and mirrors using refractive, diffractive, or nanostructured surfaces to affect the light. In some embodiments where the beam expander includes three optical components, one of the components is configured for tuning the beam expander to accept a range of input beam widths while producing a particular beam diameter (e.g., such as those described above)

Beam Converter

Also present in imaging devices of the invention is a beam converter. In some cases, the primary function of the beam converter is to convert the input illumination to uniform irradiance over a square region that is collimated. Beam converters of embodiments of the invention are configured to convert the collimated gaussian beam output from the illumination source and beam expander associated therewith, e.g., as described above, into a collimated, uniform irradiance over a region in space. By uniform irradiance over a region in space is meant uniform power over a region in space. The shape of the region in space may be any effective polygonal shape, as desired. For example, in embodiments the shape of the region in space is rectangular, square, circular or hexagonal. In some embodiments, the shape of the region in space is rectangular. In some such embodiments, the shape of the region in space is square. In certain instances the image field of view (e.g., the square region in space) has a length ranging from 200 μm to 400 μm, such as 250 μm to 350 μm, and including 275 μm to 325 μm. In some embodiments, the image field of view has a width ranging from 300 μm to 500 μm, such as, 350 μm to 450 μm and including 375 μm to 425 μm. In select versions, the image field of view has dimensions of 300 μm by 400 μm. The irradiance over the region in space may, in some instances, range from 0.1 to 50 $W/mm^2$, such as 0.5 to 35 $W/mm^2$. In select embodiments, the beam converter to delivers 31 $W/mm^2$ of power. In embodiments, the beam converter delivers 0.51 $W/mm^2$ of power. In embodiments, the beam converter delivers 2.2 $W/mm^2$ of power.

While beam converters may vary among embodiments of the invention, in some instances the beam converter includes a beam shaper. The term "beam shaper" is used in its conventional sense to refer to an optical element, such as a diffractive optical element (DOE), that transforms an incident light (e.g., laser) beam into a uniform-intensity spot with a well-defined size and shape (e.g., round, rectangular, square, line or other custom well defined shapes) and with sharp edges on a specific work plane (e.g., the spot is characterized by a sharp transition region that creates a clear border between the treated and untreated area). Of interest in embodiments of the invention are beam shapers that transform incident light into a uniform-intensity spot having a square or rectangular shape.

The term "beam shaping" is used herein in its conventional sense to mean that the beam profile of the light from an incident beam along one or more of the horizontal axis and vertical axis is changed as desired. The beam shaping component is, in embodiments, configured to generate a beam of light having a predetermined intensity profile along one or more of a horizontal axis and a vertical axis. The beam shaping component is configured to generate an output beam of light having a beam profile having an intensity at the center that is from 75% to 99.9% of the intensity at the edges along one or more of the horizontal axis and the vertical axis. In some embodiments, the beam shaping component is configured to generate an output beam of light having a beam profile having a substantially constant intensity from each edge to the center, such as where the intensity across the horizontal axis of the beam profile varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.05% or less, such as by 0.01% or less and including where the intensity across the horizontal axis of the beam profile varies by 0.001% or less. In other embodiments, the beam shaping component is configured to generate an output beam of light having a beam profile having a substantially constant intensity from each edge to the center, such as where the intensity across the vertical axis of the beam profile varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.05% or less, such as by 0.01% or less and including where the intensity across the vertical axis of the beam profile varies by 0.001% or less.

The intensity of the output beams of light can be measured with any convenient protocol, including but not limited to, a scanning slit profiler, a charge coupled device (CCD, such as an intensified charge coupled device, ICCD), a CMOS image sensor, a positioning sensor, a power sensor (e.g., a thermopile power sensor), an optical power sensor, an energy meter, a digital laser photometer, a laser diode detector, among other types of photodetectors. In some instances, to determine the intensity profile of an output beam of light, the relative intensity of each output laser beam of light is plotted as a function of the distance from the optical axis (along an orthogonal horizontal axis) of the output beam of light to determine the intensity profile at the point of irradiation. In certain embodiments, the deviation in relative intensity at predetermined distances from the optical axis is calculated to determine whether the beam profile of the output beam of light exhibits a substantially constant intensity from each edge to the center along the horizontal axis. In other embodiments, the deviation in relative intensity is calculated across the entire horizontal axis of the beam profile of the output beam of light to determine if the output beam of light exhibits a substantially constant intensity from the edge to the center. Of particular interest are measurements that evaluate the relative intensity at periodic intervals across the entire illuminated area. This may be at a variety of different periodicities depending on the application, such as a sampling of 10×10, 15×15, 20×20, etc. over the area.

In certain embodiments, the beam shaping component is configured to generate an output beam of light having a top hat intensity profile along the horizontal axis. The term "top hat" is used herein in its conventional sense to refer to a beam of irradiation (e.g., light) having near uniform fluence (energy density) along one or more axes orthogonal to the optical axis of the beam of irradiation. While top hat irradiation includes irradiation having near uniform fluence along one or more axes orthogonal to the optical axis of the beam of irradiation, the irradiation is not limited to these axes. For example, in some cases, the intensity everywhere over the area may be of interest. However, practically speaking, while measuring over enough portions of the area to represent every pixel in the sensor's field of view has value, it is generally impractical. In embodiments, output beams of light having a top hat intensity profile exhibit little to no deviation in relative intensity from each edge to the center along the horizontal axis, where beams of light having a top hat intensity profile of interest have an intensity at the center that is from 95% to 99.9% of the intensity at the edges along the horizontal axis, such as 96% to 99.5% and including from 98% to 99% of the intensity at the edges along the horizontal axis. In such instances, the beam shaping component may be viewed as a top hat beam shaping component or top hat converter.

Any convenient top hat beam shaping component may be employed. In some instances the top hat beam shaping is performed by converting the incident angle of the collimated beam into an angular distribution of light (radiance) that is uniform over a set of angles that are equal in two orthogonal directions. This angular distribution of light forms a square tophat at an infinite distance. In alternative embodiments, the top hat beam shaping component forms a circular tophat. In some instances, the top hat converter is an aspheric optic, such as an aspheric optic that includes a smooth aspheric lens, where examples include aspherical cylindrical lenses, aspherical toric lenses, etc. In some instances, the aspheric optic is described in United States Patent Application Publication Number 20200241309; the disclosure of which is herein incorporated by reference. Commercially available top hat converters that may be employed in embodiments of the invention include, but are not limited to: Ayase CSDOE converters (https://www(dot)ayasecorporation(dot)com/cs-doe-technolgies) and the like. In a certain instance these optics are made with one element, rather than the two in the Ayase description. In a certain instance these optics are made using diffractive or reflective rather than the refractive method in the Ayase description.

In certain instances where the tophat is formed in radiance or at infinity, the beam converter may include a beam transformer in light receiving relationship with the top hat converter. The "beam transformer" discussed herein may refer to one or more optical components configured to transform angles of light rays to positions of light rays in space. For example, in some instances where the beam converter produces a uniform radiance over a square solid angle (i.e., uniform power as a function of angle over a square azimuthal and elevation range of angles), the subject beam transformer creates a uniform irradiance or uniform power over a region in space. In certain instances, the subject beam transformer includes a Fourier transform lens. A Fourier transform lens that may be employed as the subject beam transformer takes a point source and generates a ray bundle from a single location and converts this into a series of rays distributed in space. The focal length of a Fourier transform lens scales the Fourier transform. The longer the focal length, the larger the spatial extent of the angular image of the source. A Fourier transform lens is a special case of an "infinite conjugate". Use of the Fourier transform lens is analogous to imaging an object at infinity, hence the use of the term infinite conjugate. Fourier transform lenses are described in, for example, Goodman, J. W. (1968). *Introduction to Fourier Optics*, incorporated by reference herein in its entirety. Commercially available optical components suitable for use as the subject beam transformer are sold by Thorlabs, Newport, and Edmund Optics.

In some instances, the beam transformer includes a telephoto group, where the telephoto group may include two or more lenses in a telephoto configuration, and in some instances includes a pair of telephoto lenses. In a specific embodiment, the beam transformer includes a telephoto lens pair, where the lenses making up the pair include a negative lens and a positive lens to achieve a long focal length with a total linear distance of much less than the focal length. In some instances, the beam transformer produces a uniform irradiance or uniform power over a region (e.g., square or rectangular region) in space from a uniform radiance over a square solid angle from the output of the beam adjuster, which beam transformer output may be described as uniform power as a function of angle over a square azimuthal and elevation range of angles.

Where desired, the beam converter may include a collimator in light receiving relationship with the beam transformer. The collimator may be configured to collimate the uniform irradiance output of the beam transformer, thereby enabling the uniform power distribution to remain constant for a desired distance. In other words, the collimator may be configured to remove a quadratic phase introduced by the beam transformer (e.g., Fourier transform lens). In some such cases, the focal length and location of the collimator are precisely matched to the beam transformer and the desired size of the top hat illumination. Typically the use of a Fourier transform lens does not result in collimated light. In the case of the top hat illumination, this means that although a uniform top hat beam is formed, it only exists in high fidelity at a single plane in space. On either side of this plane, the top hat illumination uniformity degrades, resulting in loss of optical power, an increase (or decrease) in size of the top hat beam, and a decrease in uniformity over the top hat beam area. Use of the collimator consequently allows for the maintenance of optical power. Any convenient optical collimator may be employed, where examples of optical collimators include lenses, mirrors, etc. Commercially available collimators include those sold by Thorlabs, Newport, and Edmunds. In some embodiments where the collimator includes a lens, the lens may be a singlet or doublet lens. In select instances, the lens is a singlet lens.

An embodiment of a beam converter operatively coupled to a laser/beam expander in accordance with embodiments of the invention is schematically illustrated in FIG. 1. As shown in FIG. 1, laser light from laser 110 is received by beam expander 115, which matches both the size (waist) of the Gaussian beam from the laser to the top hat beam converter 120 and ensures that the beam is collimated when it illuminates the top hat beam converter 120. Top hat beam converter 120 receives collimated light from beam expander 115 and converts the received light having a gaussian profile to illumination having a uniform radiance over a square solid angle. In light receiving relationship with the top hat beam converter 120 is telephoto lens pair 125, which produces light having uniform irradiance over a square region in space. The resultant uniform irradiance is then collimated by collimator 130.

Sample Interrogation Region

In light receiving relationship with the beam converter in devices of the invention is a sample interrogation region. The sample interrogation region is the site or location of the device at which the sample of interest resides when being imaged by the device. The sample interrogation region is positioned at a distance from the beam converter, where in some instances this distance ranges from a value greater than 0 mm to 500 mm, such as a value greater than 0 mm to 50 mm, such as 50 mm to 500 mm, such as 100 mm to 300 mm, such as 125 mm to 275 mm, such as 150 mm to 250 mm, and including 175 mm to 225 mm. In some embodiments, the distance separating the sample interrogation region and the beam converter is 100 mm or more, 125 mm or more, 150 mm or more, 175 mm or more, 200 mm or more, 225 mm or more, or 250 mm or more.

In select embodiments, one or more additional optical components may be positioned between the beam conversion optics (i.e., beam converter, beam transformer, collimator, etc.) and the sample interrogation region. The additional optical components may include, but are not limited to, a microscope objective, condenser lens, field aperture, steering mirrors, and polychroic beam splitter (i.e., configured to allow laser light to reflect towards the sample and emission from the sample to pass). The sample interrogation region may be integrated with the device, or located in a removable component that is present in the device during use, e.g., sample holder for a biological sample, e.g., such as a microfluidic device, e.g., nanofluidic chip (such as described in greater detail below).

Where desired, the device may include an aperture positioned between the beam converter and the sample interrogation region. In some instances, the subject aperture is a field aperture that is configured to restrict illumination such that only the area being imaged is illuminated. Fluorescence imaging systems employ highly intense light to produce sufficient emission to be detected by cost effective cameras. This illumination is intense enough that it often permanently damages the fluorophores, bleaching them to the point where they no longer emit fluorescence when illuminated. Therefore, if an area larger than the imaging area is illuminated, then fluorophores adjacent to the area being imaged will be damaged, destroying the image quality of areas of the sample that may be subsequently imaged. In embodiments, a field aperture of the invention reduces instances of such damage.

Accordingly, in some instances, the size of the field aperture is matched to the optical system and camera that image the sample. In further embodiments, the top hat illumination (i.e., from the beam converter) matches the field aperture, preventing the loss of laser power and loss of imaging information. The aperture may have any desired shape. Shapes of interest include polygonal shapes such as rectangles, squares, circles, hexagons, and the like. In some instances the aperture is a square aperture. For example, a square aperture of the invention may have a size ranging from 1 mm to 25 mm. Where the invention includes a condenser lens, the aperture may be separated from the condenser lens by a distance ranging from 75 mm to 250 mm, such as 150 mm to 175 mm.

The size of the interrogation region that is illuminated may vary, and in some instances ranges from 0.05 $mm^2$ to 0.5 $mm^2$, such as 0.1 $mm^2$ to 0.15 $mm^2$, including 0.11 $mm^2$ to 0.15 $mm^2$. In some embodiments, the size of the interrogation region is 0.12 mm². The dimensions of the interrogation region may vary, and in some cases range from 100 μm by 500 μm to 500 μm to 100 μm. In some instances, the interrogation region has dimensions of 300 μm by 400 μm. This relatively larger size compared to systems that illuminate with a Gaussian profile beam may provide for a number of advantages, including speed of imaging, e.g., as described in greater detail below.

The device may include a stage or platform for supporting a sample present at the interrogation region, where the sample may or may not be present in a sample holder, as desired. The stage may be static or moveable. Where moveable, the stage may be movable in one or more of X, Y and Z directions. As such, in some instances a given stage may be movable in in a single direction, e.g., an X, Y or Z direction. In some instances, a given stage may be moveable in two directions, e.g., two or X, Y or Z. In some instances, a given stage may be movable in three directions, e.g., X, Y and Z. In some embodiments, the stage may be considered to move in 5 directions: X, Y and Z, as well as rotation around the X and Y axes. Any convenient actuator may be employed to move the stage, where examples of actuators includes, but are not limited to, a motor actuated translation stage, leadscrew translation assembly, geared translation device, such as those employing a stepper motor, servo motor, brushless electric motor, brushed DC motor, microstep drive motor, high resolution stepper motor, among other types of motors.

Detector

Devices of embodiments of the invention further include a detector in light receiving relationship with the sample interrogation region. Any convenient detector may be employed, where examples of detectors include, but are not limited to: photosensors or photodetectors, such as active-pixel sensors (APSs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors and arrays thereof. In some instances, the detector is a component of an imaging device. Imaging devices may vary, where examples of imaging devices that may be present in embodiments of the devices include, but are not limited to: a cameras, a CCD arrays, infrared or UV sensors, or other imaging devices.

Computer Controlled Systems

Aspects of the present disclosure further include computer-controlled systems, where the systems include one or more computers for complete automation or partial automation of an imaging device of the invention. In some embodiments, systems include a computer having a non-transitory computer readable storage medium with a computer program stored thereon, where the computer program when loaded on the computer includes instructions for imaging a biological sample using a device of invention.

In embodiments, the system includes an input module, a processing module, and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, Python, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, or a diskette drive. Such types of memory storage devices typically read from, and/or write to, a program storage medium (not shown) such as a compact disk. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, Wi-Fi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, a USB-C port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or Wi-Fi connection to the internet at a Wi-Fi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a workstation, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows® NTR, Windows® XP, Windows® 7, Windows® 8, Windows® 10, iOS®, macOS®, Linux®, Ubuntu®, Fedora®, OS/400®, i5/OS®, IBM i®, Android™, SGI IRIX®, Oracle Solaris® and others.

Analysis Device and Methods

Imaging devices of embodiments of the invention may be configured for the analysis of varying types of analytes. In certain cases, the subject devices may be employed in biopolymer, e.g., nucleic acid, imaging applications. Devices and methods of the invention may also be used to analyze labelled RNA, labelled proteins, free floating dye that is not attached to any biological compound but merely shows circulation, dyes that label cell membranes and/or cytoplasm, and fluorescent labels that are synthesized in cells (e.g., GFP). Analysis devices in accordance with the invention may vary. In some instances, such devices are configured to image a sample interrogation of a nanofluidic chip, e.g., as described in greater detail below. The sample interrogation region may present in a sample holder, such as flow-channel of the nanofluid device, e.g., a nanochannel or portion thereof. Such imaging devices may be configured to obtain multiple images of different portions of a nanochannel, where each imaged region may be viewed as a sample interrogation region.

In some embodiments, the devices include an illumination source. The illumination may be one or more lasers, e.g., as described above, that generate a light beam having a gaussian profile. In some embodiments, the illumination sources may be 3 lasers, whose wavelengths are 473 nm, 532 nm, and 635 nm, respectively. Optically coupled to the illumination source is a beam converter of the invention, e.g., as described above. The illumination optics may include number of additional components, as desired, such as reflective and/or refractive elements, focusing elements, and filtering elements to image the biopolymers or macromolecules which are moving through the nanochannels. In embodiments, lasers are colinearly aligned. In alternative embodiments, laser light may be combined after top hats are formed (e.g., using dichroic mirrors).

In some embodiments, the device further includes an imaging device adapted to image biopolymers in the nanochannels, e.g., through the optically transparent component of the nanochannel chip. The imaging optics may be disposed generally below a sample interrogation region, and may be configured to take an image or picture of the biopolymers and/or macromolecules in the nanochannels. In some embodiments, the imaging device is adapted to image only a portion of the nanochannels at one time, and may further include a scanning structure for changing the portion of the nanochannels being imaged to permit a plurality of images to be obtained that collectively cover a desired imaging region of the nanochannels.

In some embodiments, the device further includes one or more controllers in the device that are operatively linked to the structure for moving biopolymers, the scanning structure, and the imaging device, wherein the one or more controllers are programmed to (a) activate the structure for moving biopolymers to move biopolymers into the nanochannels in linearized form; (b) maintain the biopolymers in a fixed location and linearized form in the nanochannels while controlling the scanning structure and imaging device to image the imaging region; and then (c) repeat (a) and (b) one or more times.

Analysis devices (e.g., biopolymer analysis devices, as described above) can be configured to image biopolymers in nanochannels of a nanofluid chip. In some instances, nanofluidic chips include one or more nanochannels, e.g., a chip having at least 10 parallel nanochannels formed therein, an optically transparent cover sealed to the chip and forming one side of the nanochannels; a carrier into which the chip is mounted, the carrier having an top side and a bottom side; a first liquid reservoir accessible from the top side of the carrier; and a second liquid reservoir; wherein the nanochannels are connected with and provide a fluid pathway between the first and second liquid reservoirs. In some embodiments, the nanofluidic chip and/or analysis device further includes a structure for moving biopolymers from the first liquid reservoir into the nanochannels. In some embodiments, the structure for moving biopolymers includes a first electrode in electrical contact with the first liquid reservoir, and a second electrode in electrical contact with the second liquid reservoir, such that upon energization of the first and second electrodes, charged biopolymers in the first liquid reservoir are moved into the nanochannels toward the second liquid reservoir. In some embodiments, the charged biopolymers are electrostatically moved into the nanochannels. In some embodiments, more than one nanofluidic chip is mounted on the carrier, e.g., cartridge. In some embodiments, the device includes a plurality of first liquid reservoirs and second liquid reservoirs, wherein the nanochannels are connected with and provide a fluid pathway between the plurality of first liquid reservoirs and the plurality of second liquid reservoirs. In some embodiments, the plurality of first liquid reservoirs and the plurality of second liquid reservoirs are arranged in a network. In some embodiments, the nanochannels are connected with and provide a fluid pathway between one first liquid reservoir and a plurality of second liquid reservoirs. In some embodiments, a plurality of first electrodes are in contact with the first liquid reservoir. In some embodiments, the device further includes a temperature control device in thermal contact with the carrier, the thermal device adapted to maintain the temperature of the carrier at a specified temperature.

Analysis devices of embodiments of the invention, e.g., as described above, may be used in methods of nanoanalysis using a nanofluidic chip, such as described above. Such methods may include adding a sample containing biopolymers to a first liquid reservoir; isolating the first and second liquid reservoirs from the ambient environment; applying a motive force to the first liquid reservoir to move the biopolymers from the first liquid reservoir, into and through the nanochannels of the device and into the second liquid reservoir; and capturing an image of at least a portion of the biopolymers in the nanochannels through the optically transparent window. In some embodiments, the methods further include controlling the temperature of the carrier to minimize evaporation of the sample. In some embodiments, the motive force is generated by a pair of electrodes in contact with the sample in the first liquid reservoir and the second liquid reservoir.

Figure 3:
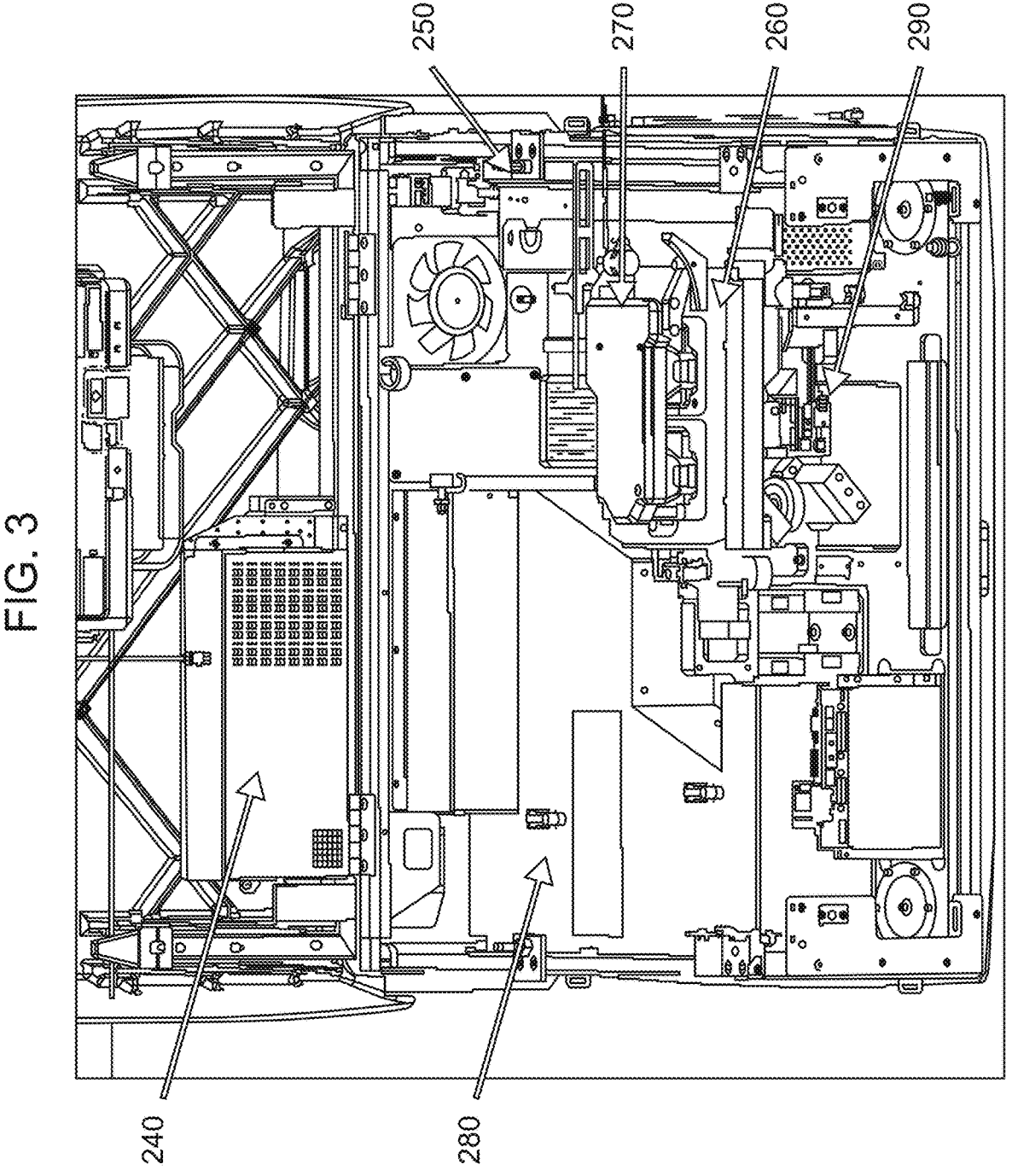
FIG. 3 shows the inside of the device shown in FIG. 2

FIG. 2 provides a view of a device for analyzing fluorescently labeled genomic DNA in accordance with the invention. Device 200 includes base 210, cover 220 and access lid 230. The device of FIG. 2 includes an illumination component of the invention, e.g., as illustrated in FIG. 1. Because the illumination component includes a telephoto lens group coupled to the top hat beam converter, the distance between the illumination component and the sample interrogation region may be relatively short, in some instances being 50 cm or less, including 40 cm or less and in some instances 35 cm or less. In some instances, the distance ranges from 10 to 50 cm, such as 20 to 40 cm. In some instances, the device may be dimensioned as a table top device, e.g., where the device has a width of 100 cm or less, such as 90 cm or less, and depth of 80 cm or less, such as 70 cm or less. FIG. 3 provides an internal view of device 200 with the cover 220 in the open position. As seen in FIG. 3, present in the device and attached to the cover is power unit 240; controller 250, and XYZ moveable stage 260 on which is placed a cartridge 270 that includes a nanochannel device. Also shown is illumination source 280 which includes a laser generating a beam with a Gaussian profile, and a beam convert of the invention, e.g., as described above, which illuminates a nanochannel or portion thereof of a nanochannel device of the cartridge with collimated beam of light having a square shape of uniform irradiance. Also shown is imaging component 290 configured to obtain images, e.g., as described above.

Figure 4A:
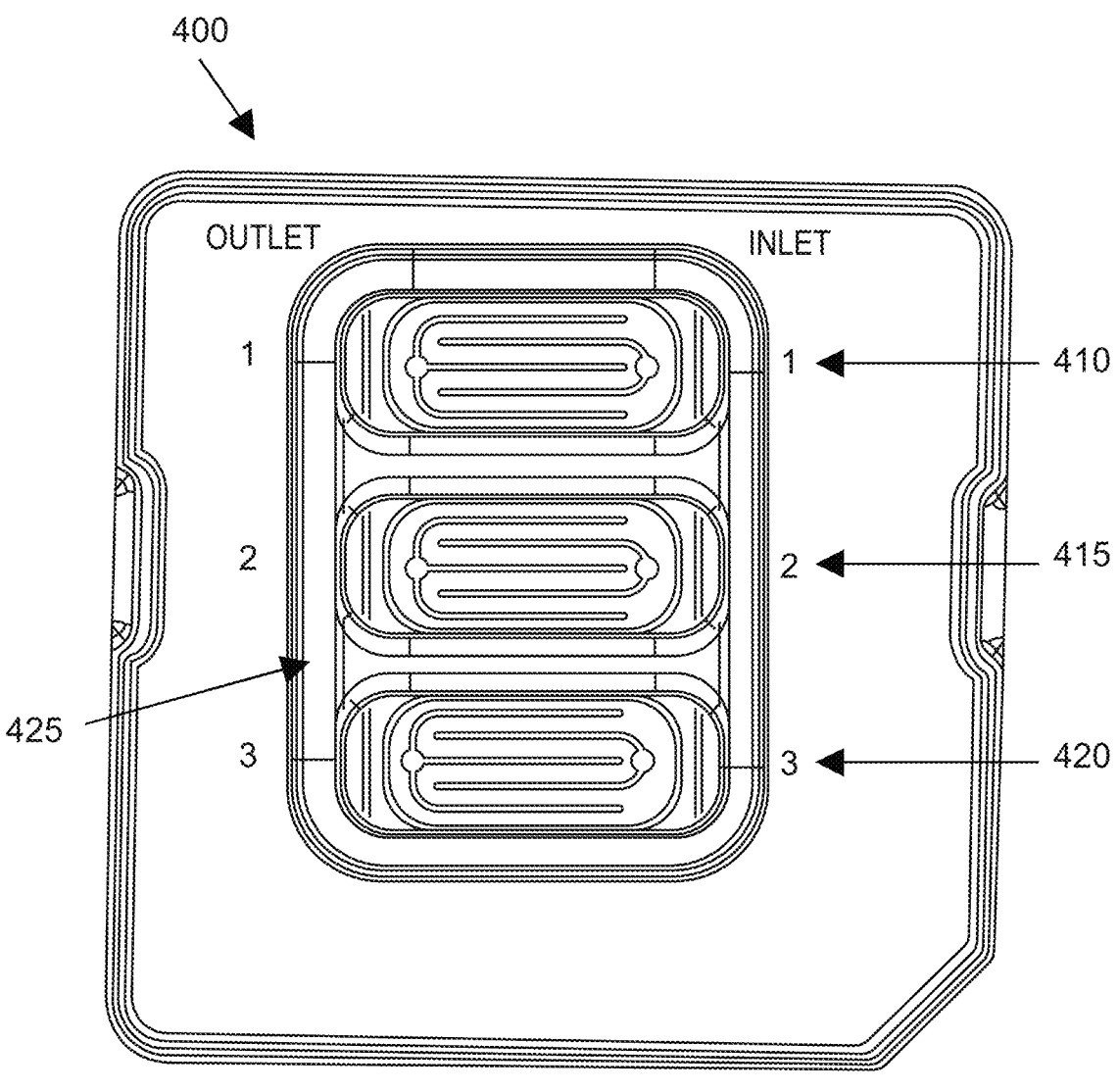
FIGS. 4A and 4B provide views of a nanofluidic device that may be imaged with the device shown in FIGS. 2 and 3.
Figure 4B:
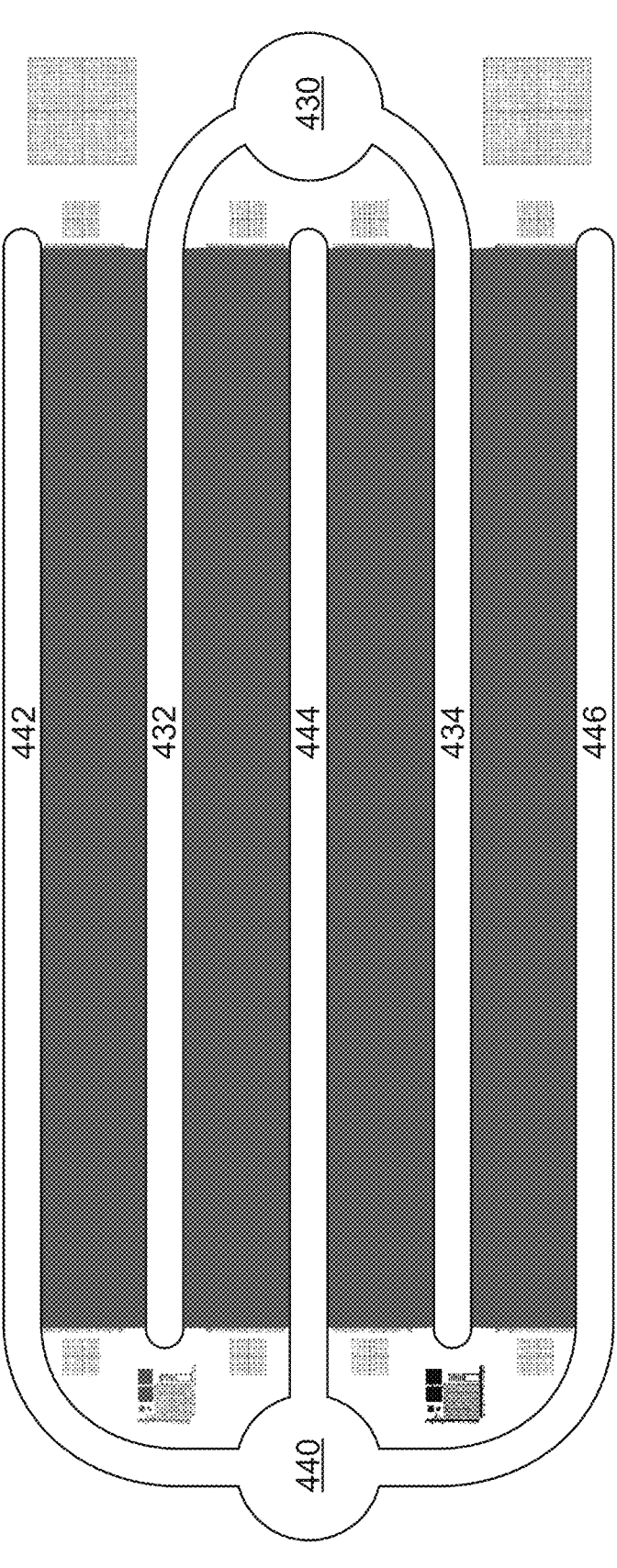

FIG. 4A provides an illustration of an example of a carrier that includes three nanochannel devices that may be imaged with the device shown in FIGS. 2 and 3. As seen in FIG. 4A, carrier 400 includes three different nanochannel devices, 410, 415 and 420. The nanochannel devices sit in depressions 425 in the carrier. The bottom of the nanochannel devices includes an optically transparent window, providing access to the channels by the illumination and imaging components of the device which are positioned below the carrier during imaging. FIG. 4B provides a close up top view of nanochannel device 410. As shown, nanochannel device 410 includes an inlet port 430 which is fluidically connected with two inflow channels 432 and 434. Nanochannel device 410 also includes an outlet port 440 which is fluidically connected with three outflow channels 442, 444 and 446. Intervening walls includes multiple nanochannels that connect the inflow and outflow channels. During use, sample is introduced into the inflow port 430, following which an electric field is applied to move fluorescently labeled DNA from the inflow channels to the outflow channels by way of the separating nanochannels. When present in the nanochannels, the fluorescently labeled DNA is imaged.

FIG. 5 illustrates a workflow of how a device in accordance with the invention, e.g., as illustrated in FIGS. 2 and 3, may be employed in an optical genome mapping (OGM) application. The OGM workflow starts with mega-base size DNA isolation, e.g., 150 kbp or longer. A single enzymatic reaction labels the genome at a specific sequence motif occurring approximately 15 times per 100 kbp in the human genome. The long, labeled DNA molecules are linearized in nanochannel arrays (e.g., provided by a Saphyr Chip®, Bionano Genomics) and imaged in an automated manner by the instrument. Using pairwise alignments, the molecules are assembled into local maps or whole genome de novo assemblies. Changes in patterning or spacing of the labels are detected automatically, genome-wide, to call all structural variants. Because the imaging device employs a beam converter of the invention, accuracy and speed of detection by the device may be improved. For example, using an imaging device of the invention, a Saphyr Chip® nanochannel device can be more efficiently and accurately analyzed with fewer scans than are required when using the current Saphyr imaging device lacking the beam converter of the invention. This is because the rate at which images can be captured is dependent on the rate at which photons are emitted from the sample. Images must be captured when the areas that have the lowest rate of photons emitted have reached the minimum number of photons required for an acceptable image. Therefore, image collection cannot proceed any faster than the dimmest portion of the image. If all portions of the image receive the same illumination, then all portions of the image are expected to be equally bright. Therefore, the more uniform the illumination, the faster images can be collected and the higher the throughput of the instrument.

Further details regarding various aspects of biopolymer analysis devices of the invention and methods of use may be found in U.S. Pat. Nos. 11,359,244; 11,292,713; 11,291,999; 10,995,364; 10,844,424; 10,676,352; 10,669,586; 10,654, 715; 10,435,739; 10,247,700; 10,000,804; 10,000,803; 9,845,238; 9,809,855; 9,804,122; 9,725,315; 9,536,041; 9,533,879; 9,310,376; 9,181,578; 9,061,901; 8,722,327; and 8,628,919; as well as published PCT Application Publication Nos. WO/2020/005846; WO/2016/036647; WO/2015/ 134785; WO/2015/130696; WO/2015/126840; WO/2015/ 017801; WO/2014/200926; WO/2014/130589; WO/2014/ 123822; WO/2013/036860; WO/2012/054735; WO/2011/ 050147; WO/2011/038327 and WO/2010/13532; the disclosures of which are herein incorporated by reference.

Additional Applications Employing Beam Converters of the Invention

While beam converters of embodiments of the invention have been primarily described in the context of biological sample imaging devices, their use is not so limited. Beam converters as described herein find use in many other applications, which applications are encompassed by the invention. Broadly speaking, beam converters of the invention find use in illumination of any system that employs coherent light for illumination and benefits from uniformity of illumination and the efficient use of laser power. Examples of such applications, in addition to the above described biopolymer analysis applications, include, but are not limited to: other fluorescence imaging applications, coherent LIDAR applications, material processing applications (e.g. laser drilling, laser annealing, semiconductor fabrication) and the like. In some embodiments, aspects of the invention find use in protein analysis, spatial genomics, human and/or animal histology/pathology, analysis of material uniformity, analysis of crystalline structure, and the like.

In some embodiments, the invention may be employed in next-generation sequencing (NGS; also referred to as "massive parallel sequencing"). NGS is a high-throughput approach to DNA sequencing and relies upon uniform detection across the field of view. As such, some embodiments of the invention involve the use of one or more of the subject beam expanders, beam converters, beam transformers etc. to produce uniform detection across the field of view in an NGS platform.

The following example(s) is/are offered by way of illustration and not by way of limitation.

EXAMPLES

Example 1: Gaussian v. Top Hat Illumination

Figure 6:
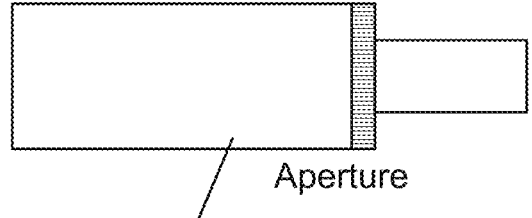
FIG. 6 shows the differences between use of a laser Gaussian beam and top hat illumination beam.
Figure 6:
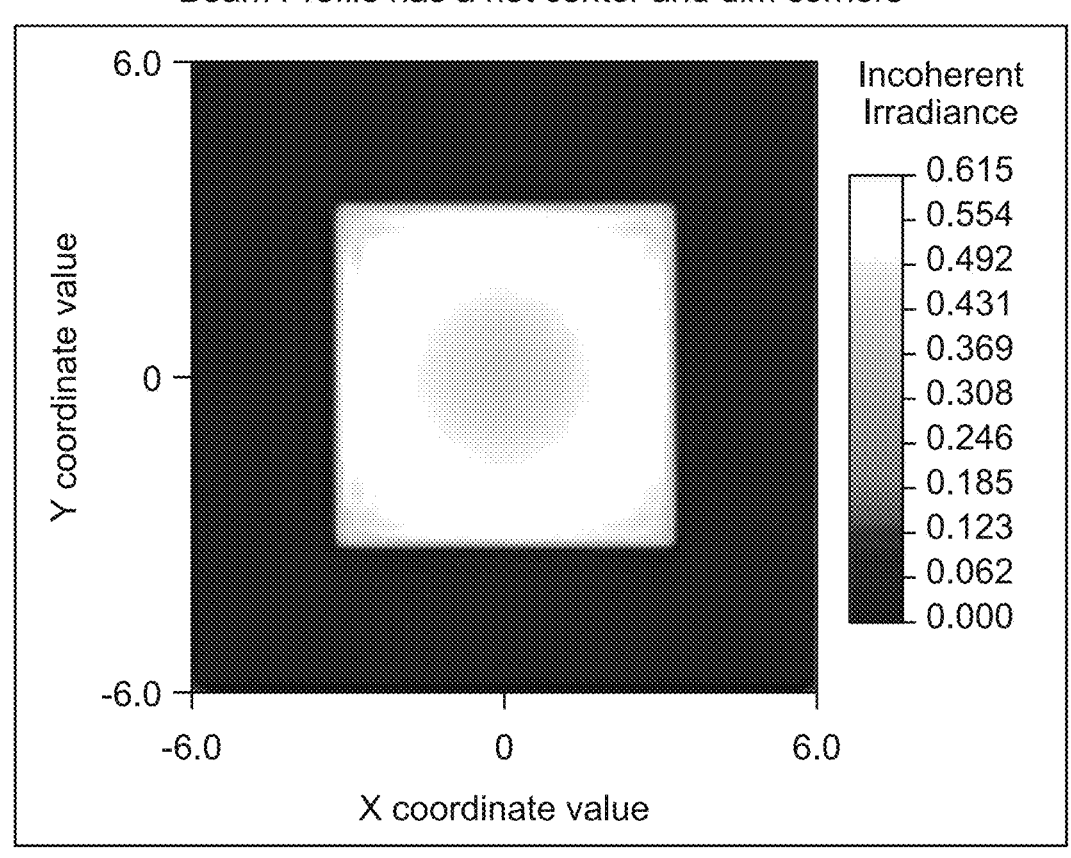
Figure 6:
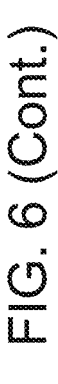
Figure 6:
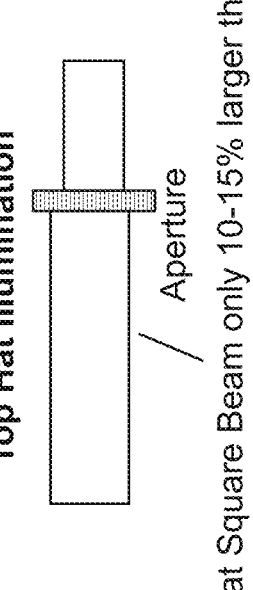
Figure 6:
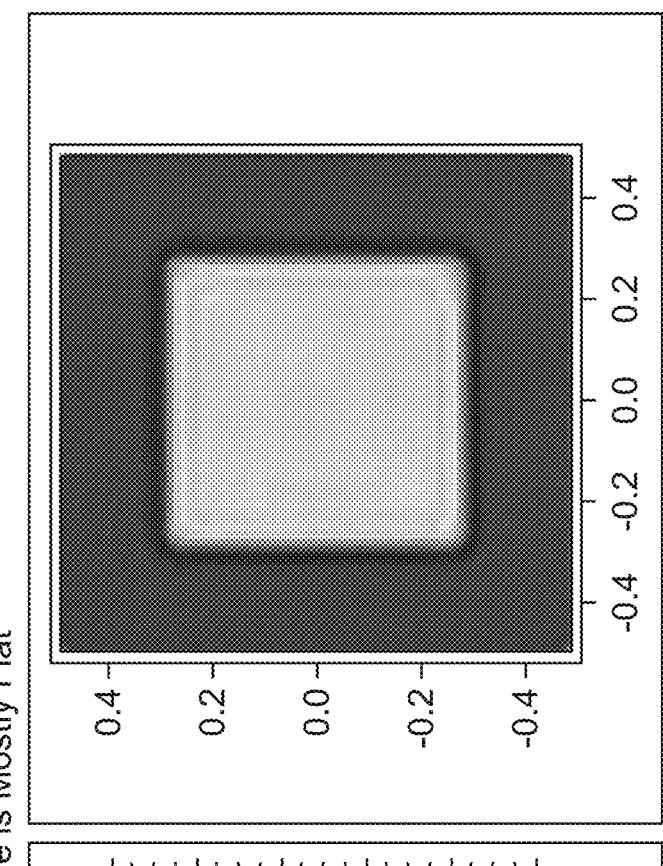
Figure 6:
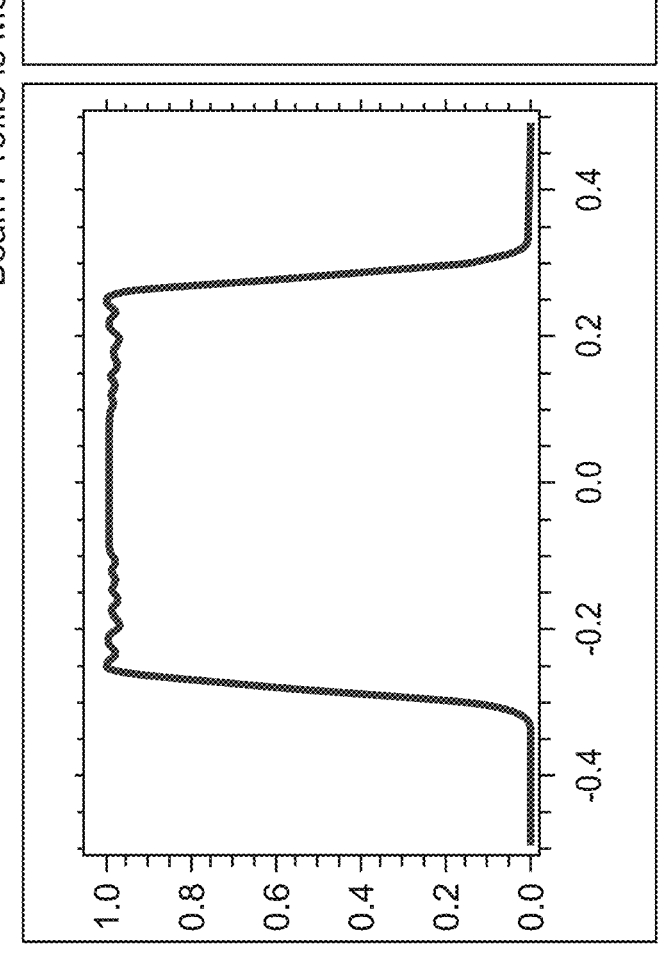

Beam profiles generated using Gaussian illumination and tophat illumination were compared. The results are shown in FIG. 6. It was found that the tophat illumination (bottom) is advantageous over merely truncating a Gaussian beam (top) because tophat illumination provides an efficient use of laser power, minimizing losses incurred when clipping the low intensity regions of the beam. In addition, tophat illumination maximizes the lowest irradiance over the field of view for a uniform intensity distribution. Maximizing the lowest irradiance over the field of view is particularly important because low lowest irradiance in the field establishes the minimum exposure duration to achieve sufficient signal for fluorescence imaging.

Example 2: Top Hat Illumination for OGM

The Top Hat Illumination for OGM platform was demonstrated on an optical breadboard. Optical components were arranged on the breadboard as shown in FIG. 1. All parts (e.g., lenses, cage components) were assembled to mechanical tolerances. The spacing between the parts was based on a model created in CAD, and was implemented using calipers. Laser illumination was aligned to irises banked to mechanical datum (metal bar). Lenses of the telephoto lens pair and beam expander were likewise aligned to the mechanical datum. The collimator was aligned to the optical system using a shear plate. In some cases, the alignment must be verified using optical measurement techniques, evaluating the effective focal length through magnification or the relationship between input illumination and output illumination, measuring collimation using a shear plate, or a large format pixelated sensor.

Figure 7:
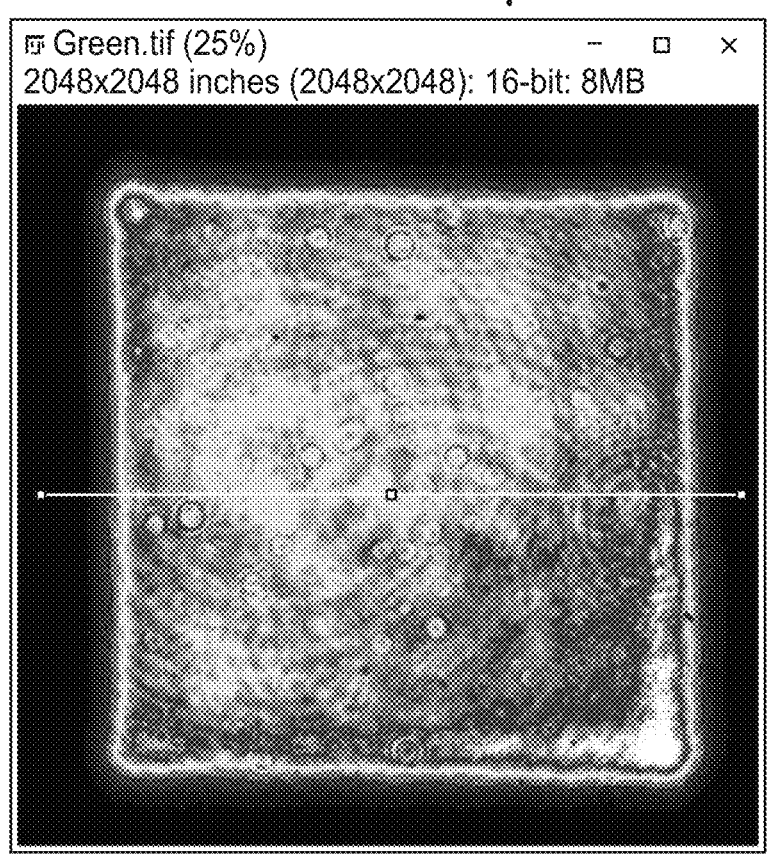
FIGS. 7 and 8 illustrate the properties of a beam produced by a beam converter in accordance with embodiments of the invention.
Figure 7:
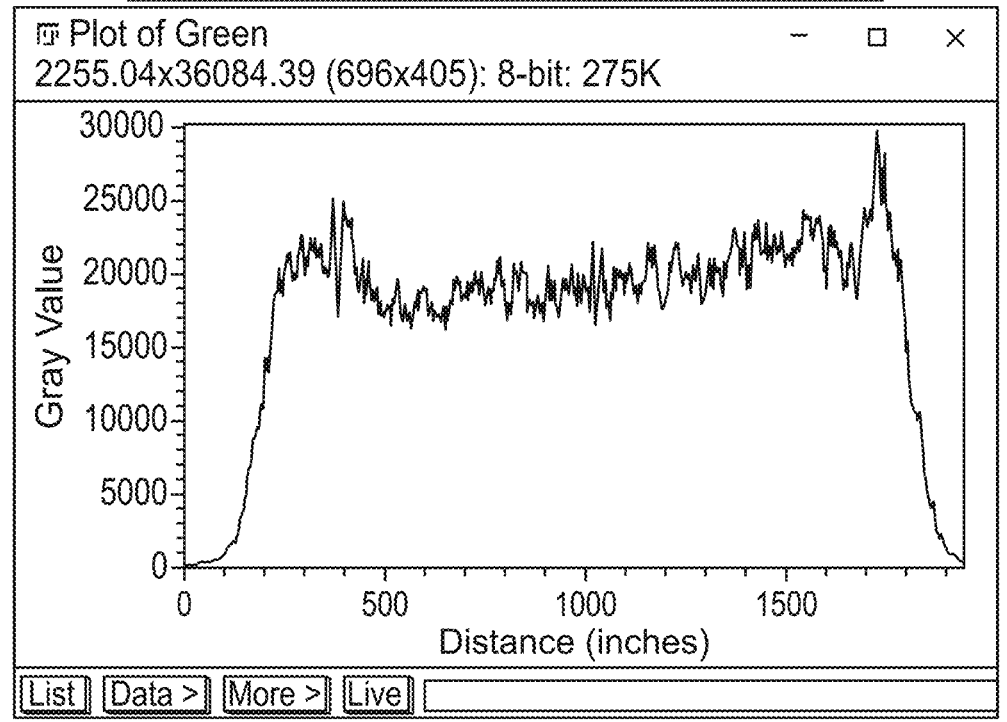
Figure 7:
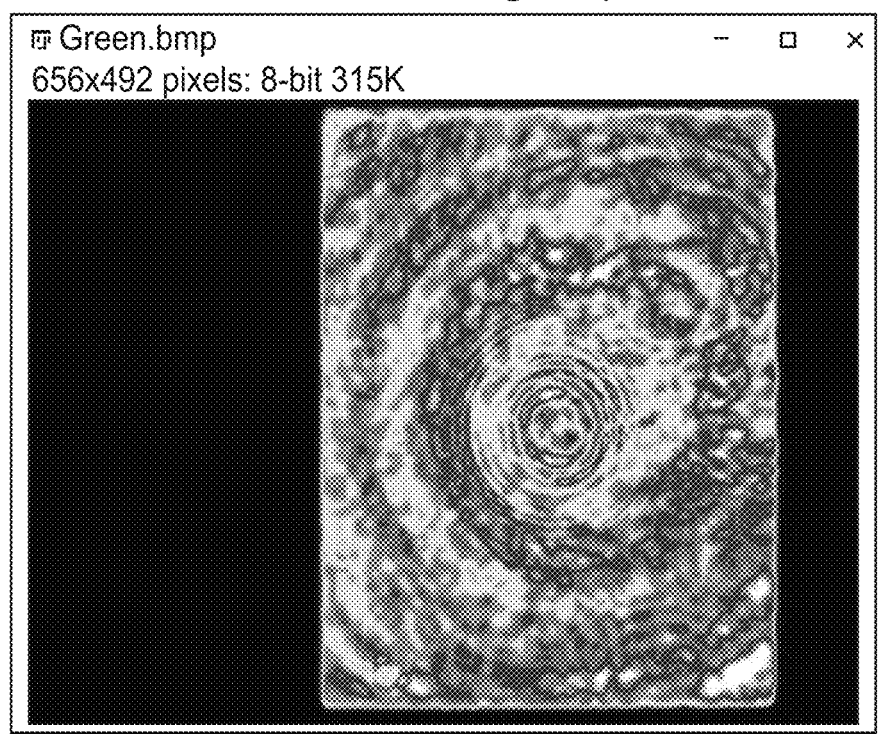
Figure 7:
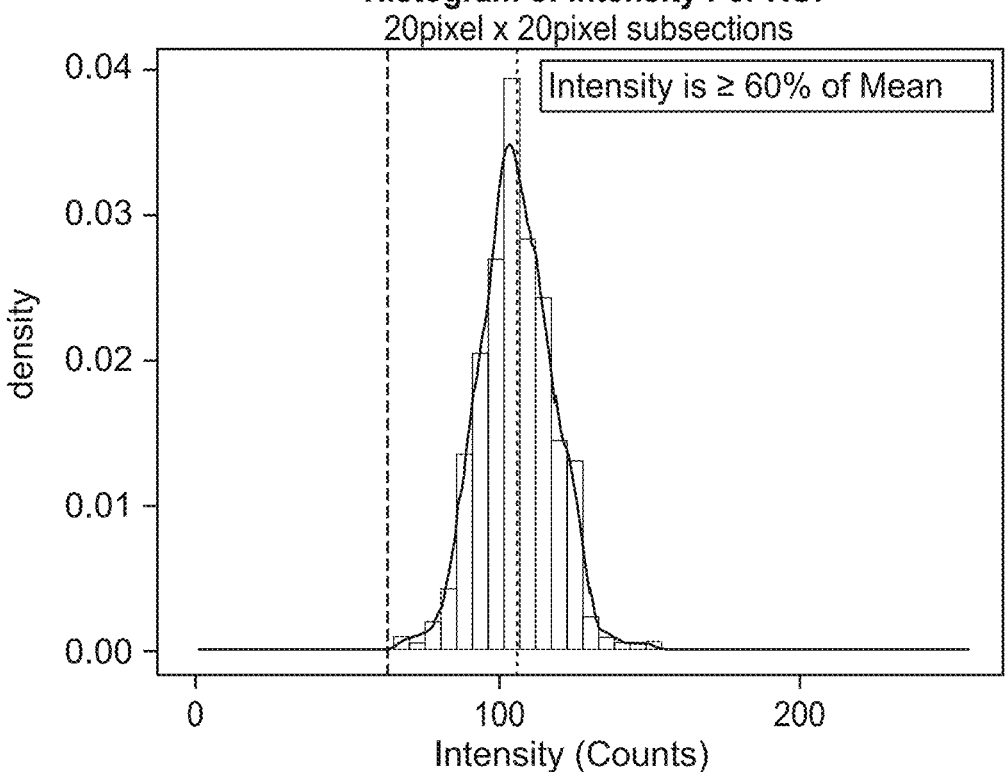

Illumination was evaluated both prior to and after the light was passed through an aperture. Illumination results prior to the aperture are shown in the top portion of FIG. 7, while the results following the aperture are shown in the bottom portion of FIG. 7.

Example 3: OGM Example

The initial Top Hat based illumination was evaluated within the Saphyr Gen 2 OGM platform using the Saphyr Gen 2.3 consumable. Predicting overall laser power efficiency, the OGM test setup used less than ½ the input laser power. The laser power efficiency from the laser head to the sample plane is greater than 60% with a Top Hat illumination, compared to an average of 30% percent for gaussian illumination. The optics from the field aperture to the objective were kept identical to standard Saphyr Gen 2 OGM platform. If using the same laser power, improved laser power efficiency reduces the laser exposure time. Theoretically, with a 2× improvement in power efficiency the sample may only need to be exposed for ½ the duration with a Top Hat illumination and maintain data quality.

Figure 8:
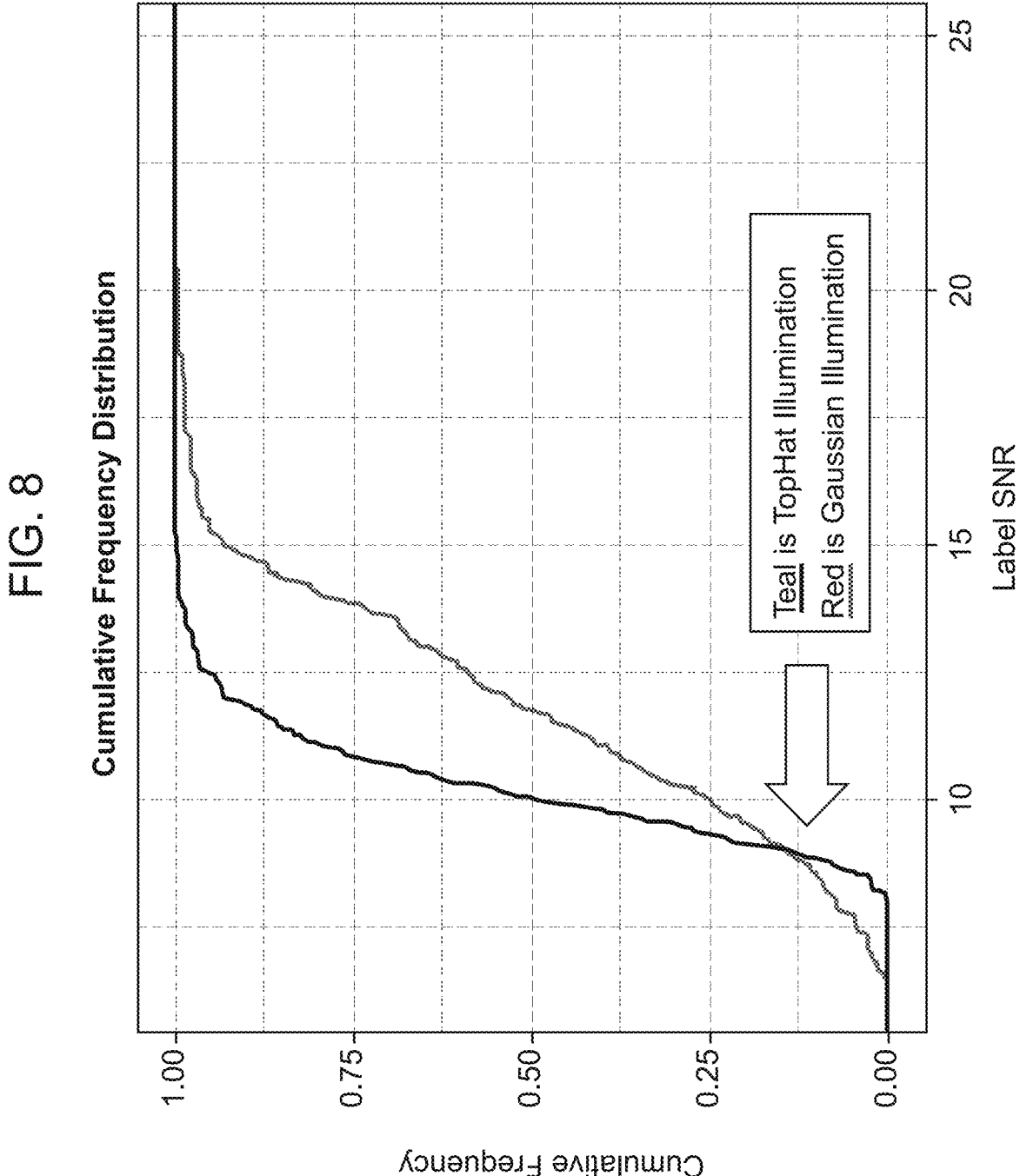

Molecule quality metrics, specifically the fluorophore signal to noise ratio (SNR), was also assessed. A single scan of 60 sq·mm of NanoChannels on a Saphyr Chip had sufficient data density to evaluate illumination performance. Data revealed that the minimum fluorophore SNR for a Top Hat illumination was greater than the minimum fluorophore SNR of a gaussian illumination (FIG. 8).

Notwithstanding the appended claims, the invention may also be defined by the following clauses:

1. A biological sample imaging device, the device comprising:
   a laser illumination source configured to produce a collimated gaussian beam having a specific diameter;
   a beam converter configured to convert the collimated gaussian beam into a collimated, uniform irradiance over a region in space;
   a sample interrogation location in light receiving relationship with the beam converter; and
   a detector in light receiving relationship with a biological sample interrogation location.

2. The biological sample imaging device according to Clause 1, wherein the beam converter comprises a top hat converter.

3. The biological sample imaging device according to Clause 2, wherein the top hat converter comprises an aspheric optic.

4. The biological sample imaging device according to Clause 3, wherein the aspheric optic comprises a smooth aspheric surface.

5. The biological sample imaging device according to any of the preceding clauses, wherein the distance separating the beam converter and the sample interrogation location is 16 inches or less.

6. The biological sample imaging device according to any Clauses 2 to 5, wherein the beam converter further comprises a beam transformer in light receiving relationship with the top hat converter.

7. The biological sample imaging device according to Clause 6, wherein the beam transformer comprises a telephoto group.

8. The biological sample imaging device according to Clause 7, wherein the telephoto group comprises a telephoto lens pair.

9. The biological sample imaging device according to any of Clauses 6 to 8, wherein the beam converter further comprises a collimator in light receiving relationship with the beam transformer.

10. The biological sample imaging device according to any of the preceding clauses, further comprising a beam expander positioned between the laser illumination source and the beam converter.

11. The biological sample imaging device according to any of the preceding clauses, further comprising an aperture between the region in space and the sample interrogation location.

12. The biological sample imaging device according to Clause 11, wherein the aperture is a square or rectangular aperture.

13. The biological sample imaging device according to any of the preceding clauses, wherein the shape of the region in space is square, rectangular, circular or hexagonal.

14. The biological sample imaging device according to any of the preceding clauses, wherein the device comprises a moveable support for the sample interrogation location.

15. The biological sample imaging device according to any of the preceding clauses, further comprising a biological sample in the sample interrogation location.

16. The biological sample imaging device according to Clause 15, wherein the biological sample is present in a sample holder.

17. The biological sample imaging device according to Clause 16, wherein the sample holder comprises a flow-channel of a nanofluidic device.

18. The biological sample imaging device according to Clause 17, wherein the flow-channel comprises a nanochannel.

19. The biological sample imaging device according to Clause 18, wherein the device is configured to illuminate an area ranging from 0.1 mm$^2$ to 0.15 mm$^2$ of the nanochannel with collimated uniform irradiance.

20. The biological sample imaging device according to Clause 19, wherein the nanofluidic device comprises multiple parallel nanochannels each comprising a biological sample.

21. The biological sample imaging device according to any of Clauses 15 to 20, wherein the biological sample comprises a nucleic acid sample.

22. The biological sample imaging device according to Clause 21, wherein the nucleic acid sample comprises labeled nucleic acids.

23. The biological sample imaging device according to Clause 22, wherein the labeled nucleic acids comprise fluorescently labeled nucleic acids.

24. The biological sample imaging device according to Clause 23, wherein the fluorescently labeled nucleic acids are 150 kbp or longer.

25. A method of imaging a biological sample, the method comprising:
    (a) illuminating a biological sample located at sample interrogation location with an illumination component comprising:
       (i) a laser illumination source configured to produce a collimated gaussian beam having a specific diameter;

(ii) a beam converter configured to convert the collimated gaussian beam into a collimated, uniform irradiance over a region in space; and (b) detecting light from the sample interrogation region to image the biological sample.

26. The method according to Clause 25, wherein the beam converter comprises a top hat converter.

27. The method according to Clause 26, wherein the top hat converter comprises an aspheric optic.

28. The method according to Clause 27, wherein the aspheric optic comprises a smooth aspheric surface.

29. The method according to any of Clauses 25 to 28, wherein the beam converter further comprises a beam transformer in light receiving relationship with the top hat converter.

30. The method according to Clause 29, wherein the beam transformer comprises a telephoto group.

31. The method according to Clause 30, wherein the telephoto group comprises a telephoto lens pair.

32. The method according to any of Clauses 29 to 31, wherein the beam converter further comprises a collimator in light receiving relationship with the beam transformer.

33. The method according to any of Clauses 25 to 32, wherein the illumination component further comprises a beam expander positioned between the laser illumination source and the beam converter.

34. The method according to any of Clauses 25 to 33, wherein the illumination device further comprises an aperture between the region in space and the sample interrogation location.

35. The method according to Clause 34, wherein the aperture is a square or rectangular aperture.

36. The method according to any of Clauses 25 to 35, wherein the shape of the region in space is square, rectangular, circular or hexagonal.

37. The method according to any of Clauses 25 to 36, wherein the biological sample is present in a sample holder.

38. The method according to Clause 37, wherein the sample holder comprises a flow-channel of a nanofluidic device.

39. The method according to Clause 38, wherein the flow-channel comprises a nanochannel.

40. The method according to Clause 39, wherein illumination component illuminates an area ranging from 0.1 $mm^2$ to 0.15 $mm^2$ of the nanochannel with collimated uniform irradiance.

41. The method according to Clause 40, wherein the nanofluidic device comprises multiple parallel nanochannels each comprising a biological sample.

42. The method according to any of Clauses 25 to 41, wherein the biological sample comprises a nucleic acid sample.

43. The method according to Clause 42, wherein the nucleic acid sample comprises labeled nucleic acids.

44. The method according to Clause 43, wherein the labeled nucleic acids comprise fluorescently labeled nucleic acids.

45. The method according to Clause 44, wherein the fluorescently labeled nucleic acids are 150 kbp or longer.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof.

Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A biological sample imaging device, the device comprising:

a laser illumination source configured to produce a collimated gaussian beam having a specific diameter;

a beam converter comprising a top hat converter configured to convert the collimated gaussian beam into a collimated, uniform irradiance over a region in space;

a telephoto group in light receiving relationship with the top hat converter;

a collimator in light receiving relationship with the telephoto group;

a sample interrogation location in light receiving relationship with the collimator; and a detector in light receiving relationship with a biological sample interrogation location.

2. The biological sample imaging device according to claim 1, wherein the top hat converter comprises an aspheric optic.

3. The biological sample imaging device according to claim 2, wherein the aspheric optic comprises a smooth aspheric surface.

4. The biological sample imaging device according to claim 1, wherein the distance separating the beam converter and the sample interrogation location is 16 inches or less.

5. The biological sample imaging device according to claim 1, wherein the telephoto group comprises a telephoto lens pair.

6. The biological sample imaging device according to claim 1, further comprising a beam expander positioned between the laser illumination source and the beam converter.

7. The biological sample imaging device according to claim 1, further comprising an aperture between the region in space and the sample interrogation location.

8. The biological sample imaging device according to claim 7, wherein the aperture is a square or rectangular aperture.

9. The biological sample imaging device according to claim 1, wherein the shape of the region in space is square, rectangular, circular or hexagonal.

10. The biological sample imaging device according to claim 1, wherein the device comprises a moveable support for the sample interrogation location.

11. The biological sample imaging device according to claim 1, further comprising a biological sample in the sample interrogation location.

12. A method of imaging a biological sample, the method comprising:

(a) illuminating a biological sample located at sample interrogation location with an illumination component comprising:

(i) a laser illumination source configured to produce a collimated gaussian beam having a specific diameter;

(ii) a beam converter comprising a top hat converter configured to convert the collimated gaussian beam into a collimated, uniform irradiance over a region in space;

(iii) a telephoto group in light receiving relationship with the top hat converter; and (iv) a collimator in light receiving relationship with the telephoto group; and (b) detecting light from the sample interrogation region to image the biological sample.

13. The method according to claim 12, wherein the top hat converter comprises an aspheric optic.

14. The method according to claim 13, wherein the aspheric optic comprises a smooth aspheric surface.

15. A biological sample imaging device, the device comprising:

a laser illumination source configured to produce a collimated gaussian beam having a specific diameter;

a beam converter comprising a top hat converter configured to convert the collimated gaussian beam into a collimated, uniform irradiance over a region in space;

a telephoto group in light receiving relationship with the top hat converter;

a sample interrogation location in light receiving relationship with the telephoto group; and a detector in light receiving relationship with a biological sample interrogation location.

\* \* \* \* \*